US006833849B1

(12) United States Patent
Kurokawa et al.

(10) Patent No.: US 6,833,849 B1
(45) Date of Patent: Dec. 21, 2004

(54) VIDEO CONTENTS ACCESS METHOD THAT USES TRAJECTORIES OF OBJECTS AND APPARATUS THEREFOR

(75) Inventors: Masato Kurokawa, Yokohama (JP); Tomio Echigo, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 297 days.

(21) Appl. No.: 09/620,113

(22) Filed: Jul. 20, 2000

(30) Foreign Application Priority Data

Jul. 23, 1999  (JP) .......................................... 11-208317

(51) Int. Cl.[7] .............................................. G09G 5/00
(52) U.S. Cl. ....................... 345/723; 345/724; 345/725; 345/726; 345/730; 345/731
(58) Field of Search ................................ 345/723–726, 345/730–732, 302, 355, 600, 591, 420; 348/169, 699, 143; 367/127

(56) References Cited

U.S. PATENT DOCUMENTS

| | | | | |
|---|---|---|---|---|
| 3,996,590 A | * | 12/1976 | Hammack ................... 342/465 |
| 4,893,182 A | * | 1/1990 | Gautraud et al. ........... 348/579 |
| 5,287,446 A | * | 2/1994 | Williams et al. ............ 345/474 |
| H001506 H | * | 12/1995 | Beretta ....................... 345/591 |
| 5,764,283 A | * | 6/1998 | Pingali et al. .............. 348/169 |
| 5,768,151 A | * | 6/1998 | Lowy et al. .................... 463/2 |
| 5,781,505 A | * | 7/1998 | Rowland ..................... 367/127 |
| 5,923,365 A | * | 7/1999 | Tamir et al. ................ 348/169 |
| 5,969,755 A | * | 10/1999 | Courtney .................... 348/143 |
| 6,144,375 A | * | 11/2000 | Jain et al. ................... 345/420 |
| 6,215,505 B1 | * | 4/2001 | Minami et al. ............. 345/723 |
| 6,366,296 B1 | * | 4/2002 | Boreczky et al. .......... 345/719 |

FOREIGN PATENT DOCUMENTS

JP           09-200666           7/1997

OTHER PUBLICATIONS

Hjelsvold et al., Searching and Browsing a Shared Video Database, 1995, IEEE, pp. 90–98.*
Yoneda et al., A new Communication Tool: Time Dependent Multimedia Document, 1992, IEEE, pp. 90–97.*

* cited by examiner

Primary Examiner—Ba Huynh
Assistant Examiner—Truc Tuy Chuong
(74) Attorney, Agent, or Firm—Scully, Scott, Murphy & Presser; Daniel P. Morris, Esq.

(57) ABSTRACT

A method and an apparatus for using the trajectory of an object to access video contents, for example, to specify and display a specific video image scene. Such a video contents access method comprises the steps of: extracting objects from video contents; displaying movements of the objects as trajectories on a specific projection screen; specifying locations on the trajectories; and accessing a desired scene of the video contents. An apparatus is so designed that it performs the above method.

7 Claims, 5 Drawing Sheets

VIDEO CONTENTS ACCESS METHOD THAT USES TRAJECTORIES OF OBJECTS AND APPARATUS THEREFOR

BACKGROUND OF THE INVENTION

1. Technical Field

The present invention relates to a method and an apparatus for using the trajectory of an object to access video contents, for example, to specify and display a specific video image scene.

2. Prior Art

To access the contents of a video, which constitutes a sequential media, a time must be designated for the portion that is to be accessed. Relative to this, the advantage of digital video is that immediate access to a desired scene is possible so long as a time is designated. However, to access a desired portion, the use of a specific guide is required. Presently, according to a typical technique used for this purpose, a story board is used whereon shot change images are arranged, and a desired shot change image can be accessed by clicking on the image. But there are video contents for which shot changes are meaningless, and only an image acquired at a specific time in a scene between shots can be used as a representative image. For example, in spots, shot changes are repeated for unimportant scenes to prevent a user from becoming bored, while for an important scene, images acquired using a camera with which it is anticipated the best images can be obtained are continued so as not to miss a moment of the important scene. Therefore, since an important scene may be missed by using a representative image obtained as a shot change, an interface is required with which a scene can be designated an important scene.

According to an example method for accessing the above video contents, the trajectory of an object is extracted from the video, and is used for a video search. With this method, however, the trajectory of the object is displayed and is superimposed on a video image on a display device, so that the display image is difficult to see and the video contents can not be efficiently accessed. Further, according to this example, the video search is performed only by matching trajectories. In addition, even if the video contents can be accessed the access efficiency is not satisfactory.

To resolve the above objectives, it is one object of the present invention to provide a video contents access method, for which the trajectory of an object is used, whereby the trajectory of an object that is displayed separately from a video image is used to efficiently specify and display a video image scene desired by a user, and also to provide an apparatus therefor.

SUMMARY OF THE INVENTION

The present invention relates to a method for using the trajectory of an object to access video contents to, for example, specify and display a specific video image scene. Such a video contents access method comprises the steps of: extracting objects from video contents; displaying the movements of the objects as trajectories on a specific projection screen; specifying locations along the trajectories; and accessing a desired scene contained in the video contents.

Furthermore, according to the present invention, a video contents access apparatus comprises: display means for displaying, as trajectories on a specific projection screen, the movements of objects extracted from video contents; and instruction means for specifying locations along the trajectories, whereby the above described video contents access method is performed.

According to the present invention, the objects, such as the states of players, are specified by using trajectories displayed on a projection screen, without directly providing a video for a user. Therefore, the process performed by a computer is simplified, and it is anticipated that the status of a game will be reported to a user, even if the trajectories of the objects are displayed at high speed. In addition, the user can use a trajectory to determine which video frame is to be accessed, and only when the user selected a point on the trajectory can the current frame jump to a corresponding frame and can a video be replayed. Furthermore, since the information carried by a trajectory interacts with an actual object in the contents, such as an individual player or a ball, to the user it will seem as though he or she is controlling it directly. As a result, the desired video image scene can be efficiently specified and displayed.

As the preferred embodiment of the present invention, the trajectories of the objects are those that are displayed, in order with time for video contents, in a time interval lying between a currently displayed video frame and a preceding video frame that was displayed a predetermined time period earlier. Furthermore, a user can control the speed at which the trajectories of the objects are displayed. A scale (play advantage) for representing an important scene is displayed on a projection screen by using the trajectories (Traj) of the objects, which are calculated using the following equation: Traj=(object ID, start time, end time, line graph representation). The video data are digital video data, or analog video data that can manage time code. Furthermore, a window for displaying images of said video contents and a window for displaying said trajectories of said objects are displayed on the same projection screen. To specify said locations on said trajectories, points on the trajectories are designated by using a pointing device. In this embodiment, a plurality of video objects are used, and with this arrangement, the present invention can be efficiently carried out.

BRIEF DESCRIPTION OF THE DRAWINGS

Preferred embodiments of the present invention will now be described, by way of example only, with reference to the accompanying drawings in which.

DETAILED DESCRIPTION OF THE PREFERRED EMBODIMENTS OF THE INVENTION

Figure 1:
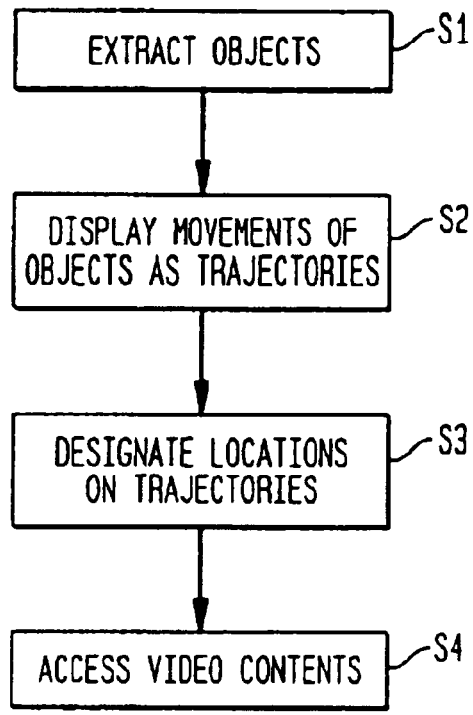
FIG. 1 is a flowchart for explaining the concept of a method, according to the present invention, whereby the trajectory of an object is used for accessing video contents.

FIG. 1 is a flowchart for explaining the concept, according to the present invention, of a method for accessing video contents by using the trajectories of objects. In FIG. 1, first, an object is extracted from video contents using a conventional area division method (step S1). Then, the movement of the object is displayed as a trajectory on a specific projection screen (S2).

The time interval at which the movement of the object is obtained as the trajectory is not especially specified. However, if the trajectory is obtained for all the time intervals, depending on the size of the projection screen, the number of objects and the movement speeds, the trajectory may become too complicated, and specifying a frame during the following process will not be possible. Therefore, it is preferable that the selected time interval be between a currently displayed frame and a preceding frame that was displayed several seconds to several minutes earlier. In this manner, the video contents can be scanned. Following this, a location on the trajectory is specified by using a pointing device (step S3). And finally, a desired scene in the video contents is accessed. That is, the current frame jumps to the video frame of the desired scene, which is then displayed as a static scene, or replay is started beginning with the selected scene (step S4).

An explanation will now be given for a case where the present invention is applied for a sports video, such as one for a soccer match, as an example of the method used for accessing video contents by using the trajectory of an object. In a sports video, such as one for a soccer match, the position occupied by a player on a field, the trajectory of the player's movement and the trajectory of a soccer ball are very meaningful information. These data can be manually entered, or can be obtained by having a computer extract the objects represented by the player and the ball, and shift information for a camera that picks up the objects can be acquired by recovering a camera parameter. These data for a specific scene can be represented by using images as a set of trajectories on the field, and what is depicted in the video can be observed.

Figure 2:
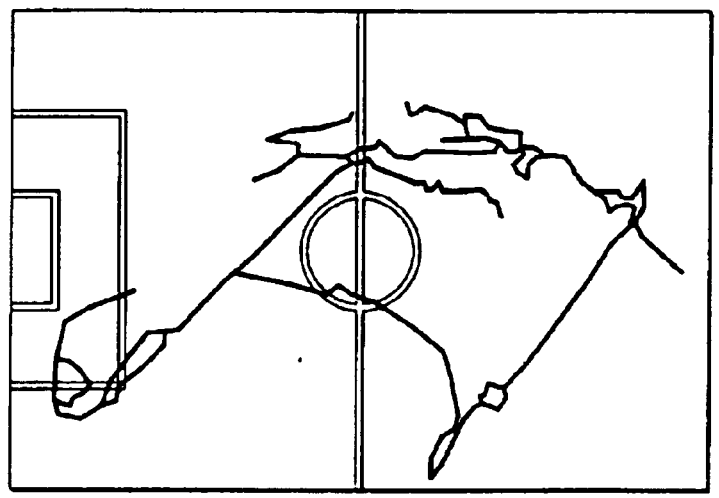
FIG. 2 is a photo diagram in which, for a soccer game that is used as an example, a window that is used for displaying images of video contents and a window that is used for displaying the trajectory of an object are shown on the same projection screen.

FIG. 2 is a diagram showing the existing state wherein the trajectories of the movements of a plurality of objects, i.e., players, during a predetermined time period are displayed on a projection screen in an overhead view of a soccer field. In FIG. 2, in a soccer scene covering a 20 second period, the movements of the main players are indicated by thin black lines, and the movement of a ball is indicated by a thick red line. To obtain this display, the objects are extracted from a scene shot during an actual soccer match, the camera movement parameter is automatically extracted, and the movements of the individual objects are replayed on a projection screen representing the soccer field. The ball is passed several times in this scene, and the passes are apparently identified on the screen.

The above representation is meaningful for video contents, such as sports or surveillance, for which space can be posited as a background, such as the soccer field in FIG. 2, and wherein the position and movement of each object on the background and a positional relationship between them are closely related to the contents. In accordance with a coordinate string and the time interval used in the contents, the information concerning the trajectories (Traj) are internally represented as follows:

Traj=(object ID, start time, end time, line representation), wherein the line representation denotes the coordinate string of an object in an interval extending from the start time to the end time. This string can be a time series of coordinate values, or can be represented by approximate lines. When approximate line representation is used, the time at which the coordinate value and the trajectory pass through a specific point must be described as a pair, such as (x, y, t), for individual nodes at the approximate lines. As a result, if one point on the trajectory in the field is designated, a point of intersection with the closest line is calculated, and the time between two adjacent nodes is interpolated to determine a corresponding time. When the location is moved along the trajectory by using a pointing device, such as a mouse, a preceding or succeeding video scene can be accessed along the corresponding time. Of course, the names of actual players can be provided for the object IDs, and the player's names can be superimposed on the individual trajectories.

An explanation will now be given for an example where the above data are used to scan the contents (e.g., a soccer match) for a specific period of time. Since all the trajectories are represented for an actual game of 90 minutes, they are written on the field many times. Therefore, the movements of the objects are represented by drawing the trajectories only for a specific time period (e.g., one minute). A mechanism, in the form of a slider, for adjusting the display speed for the trajectory is provided for a user.

Further, in this invention, a specific scale (play advantage) that represents an important scene can be displayed at the same time, separately from the soccer field, on the projection screen in FIG. 2 on which the trajectories of the objects are displayed. For a soccer game, for example, the play advantage for a team is represented as:

play advantage=1.0−(r/squrt (W*W+H*H)), wherein r denotes a distance representing how closely a player handling a ball has approached the goal of the opposing team; denotes the length of a field along a touch line; and 2H denotes the length along a goal line. If the play advantage is expressed as a graph, in accordance with the time required for the playback of the trajectory, the user can use the play advantage as a guide for adjusting the speed for the playback of the trajectory.

Specifically, while a user monitors the playback of the trajectory and the play advantage, he or she can adjust the display speed and halt the playback at an appropriate and interesting scene. The user can move and click the pointing device to specify an interesting trajectory on the field at the time at which the video is halted, so that the actual video contents can be accessed. When, for example, the video is accessed in consonance with the movement of the ball, a scene wherein specific passes are made can be accessed. Further, if the user wants to view the video in consonance with the movement of a specific player, the user need only point at the trajectory for that player. Furthermore, if, as on a soccer field, areas are defined (goal areas or penalty areas), or when the user wants to view the movement of a specific player in the penalty area, only the intersection of the trajectory and the penalty area need be designated and the pertinent frame can be accessed and replayed.

For video contents, such as those obtained for sports relay broadcasting using a plurality of cameras (when a plurality of cameras is used to film a game), assuming that the timings used for the cameras are almost fully synchronized, the spatial representation essentially indicates the same thing. Therefore, with trajectories used as media, it is easy to view the states of the players from another angle at a specific time, and the surrounding circumstances when a specific play is performed.

An explanation will now be given for an example wherein, by using the video contents accessing method of the present invention, a window for displaying images of video contents and a window for displaying the trajectories of objects are displayed on the same production screen. FIG.

Figure 3:
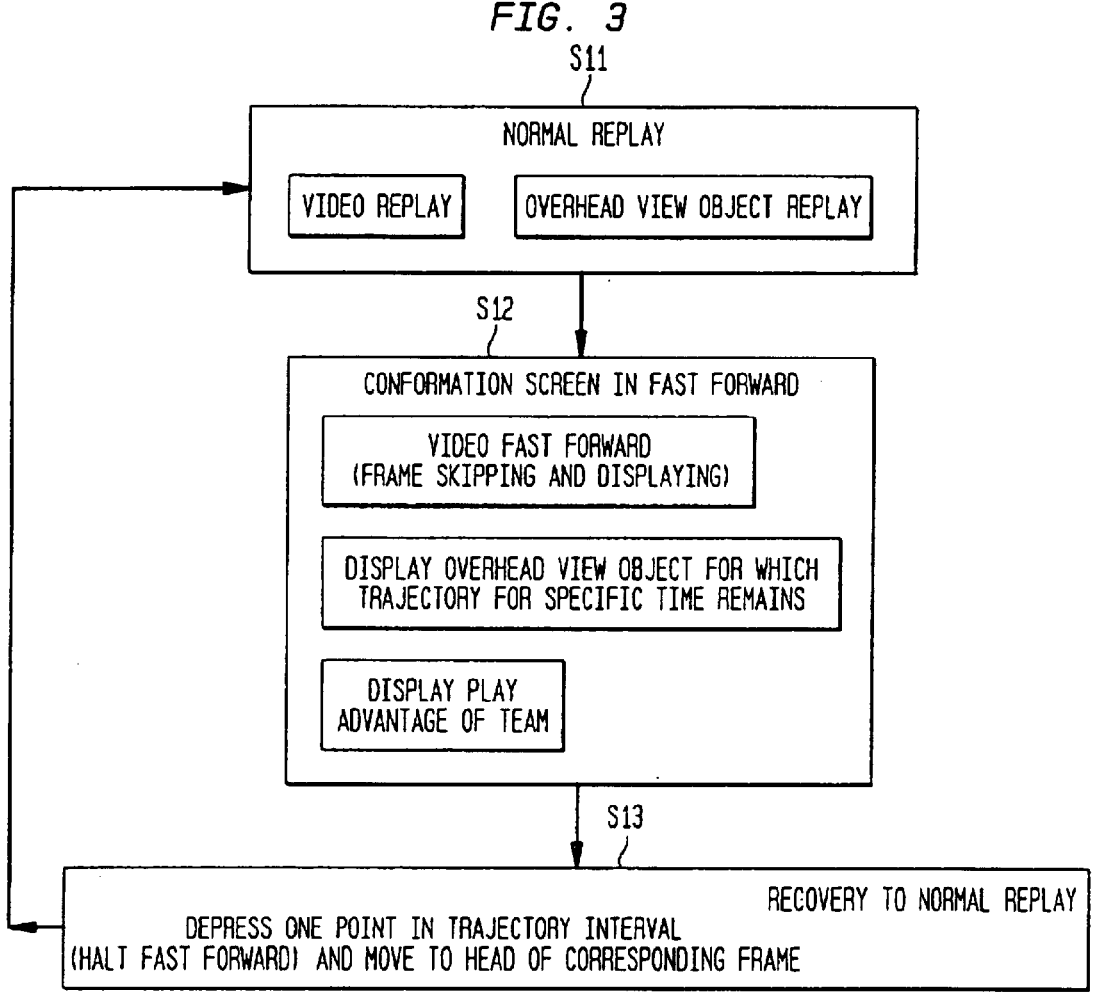
FIG. 3 is a flowchart for explaining one embodiment of the present invention wherein a window for displaying images of video contents and a window for displaying the trajectory of an object are shown on the same projection screen.

3 is a flowchart for this example. In FIG. 3, first, in the normal replay process (step S11), normal video replay is performed in a video replay window, while in an object replay window, normal replay is performed for an overhead view of an object for which the trajectory, for a specific time period, remains that which corresponds to the replayed video portion. Then, on a confirmation screen for fast forward viewing (step S12), in the video replay window the video is fast forwarded (frame skipping and displaying), while the overhead view object, for which the above trajectory remains the same, is displayed in the object replay window and, at the same time, the above play advantage is also displayed. Then, when a point in the displayed trajectory interval is pointed at (or the fast forward is halted), the scene moves to the head of a corresponding frame, so that normal replay is resumed (step S13). The processing for this example is performed by repeating steps S11, S12 and S13. The individual steps will now be described.

Figure 4:
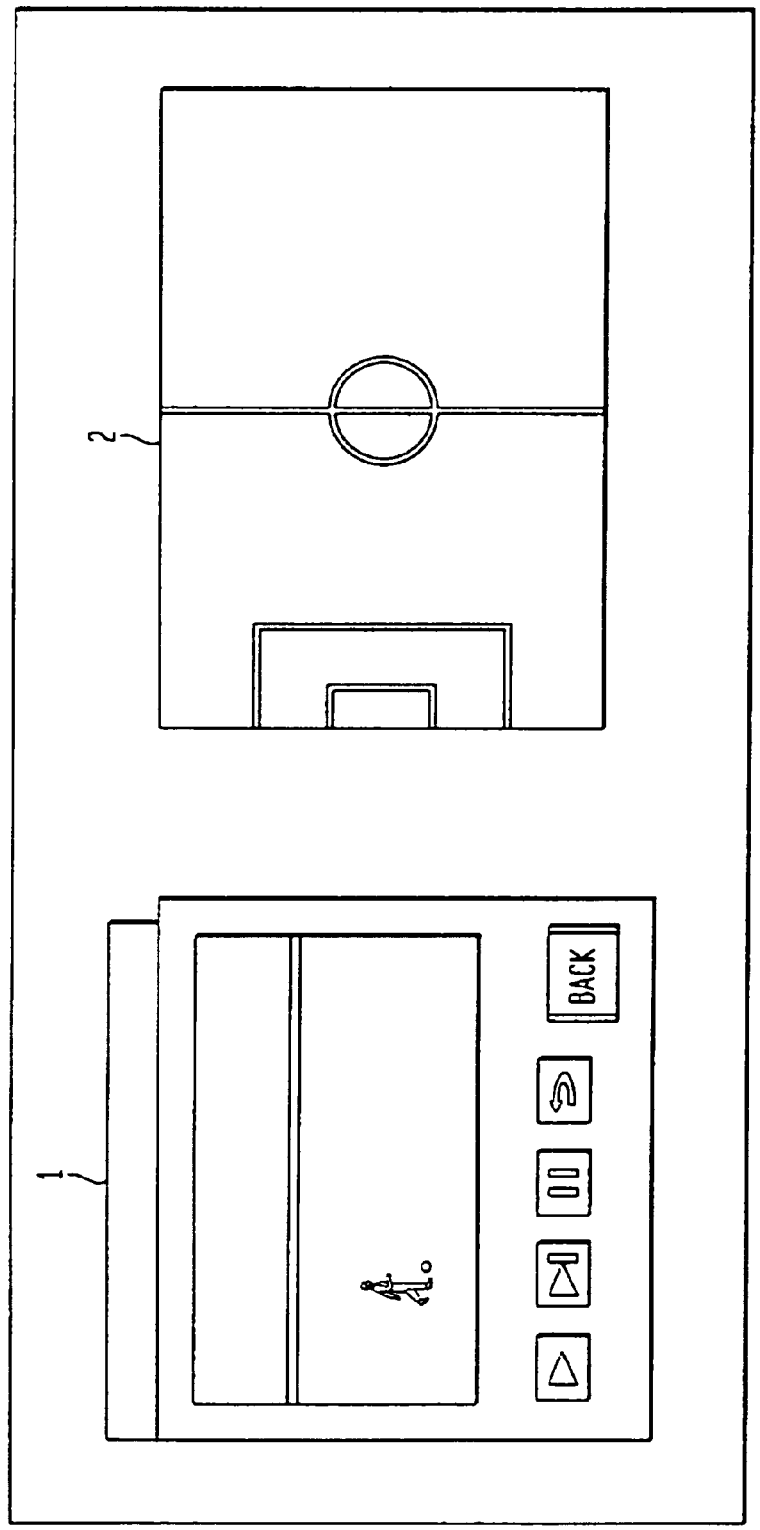
FIG. 4 is a photo diagram showing an example normal display screen for the flowchart in FIG. 3.

FIG. 4 is a diagram showing an example display screen in the normal replay process (step S11). In FIG. 4, window 1 is used to display images of video contents, and window 2 is used to display the trajectory of an object. In window 1, video data are replayed. Digital video data, such as MPEG-½, or analog video data, which can manage time code, can be used as the video data. In window 2, the object in the overhead view is replayed. To replay an object, meta-data (the location of an object, the team of the object, an object ID, etc.) for an object extracted from video data, and the filming condition (the location of a camera and a moving parameter) are displayed as needed. In the example in FIG. 4, the video data are replayed and displayed at normal speed in accordance with a change in the positional information for an object (a player or a ball). Assuming that the meta-data for the object have previously been extracted, based on the location of a camera, which represents the filming condition, and the moving parameter for the camera, the meta-data are converted to plot the location of the object in the overhead view.

Figure 5:
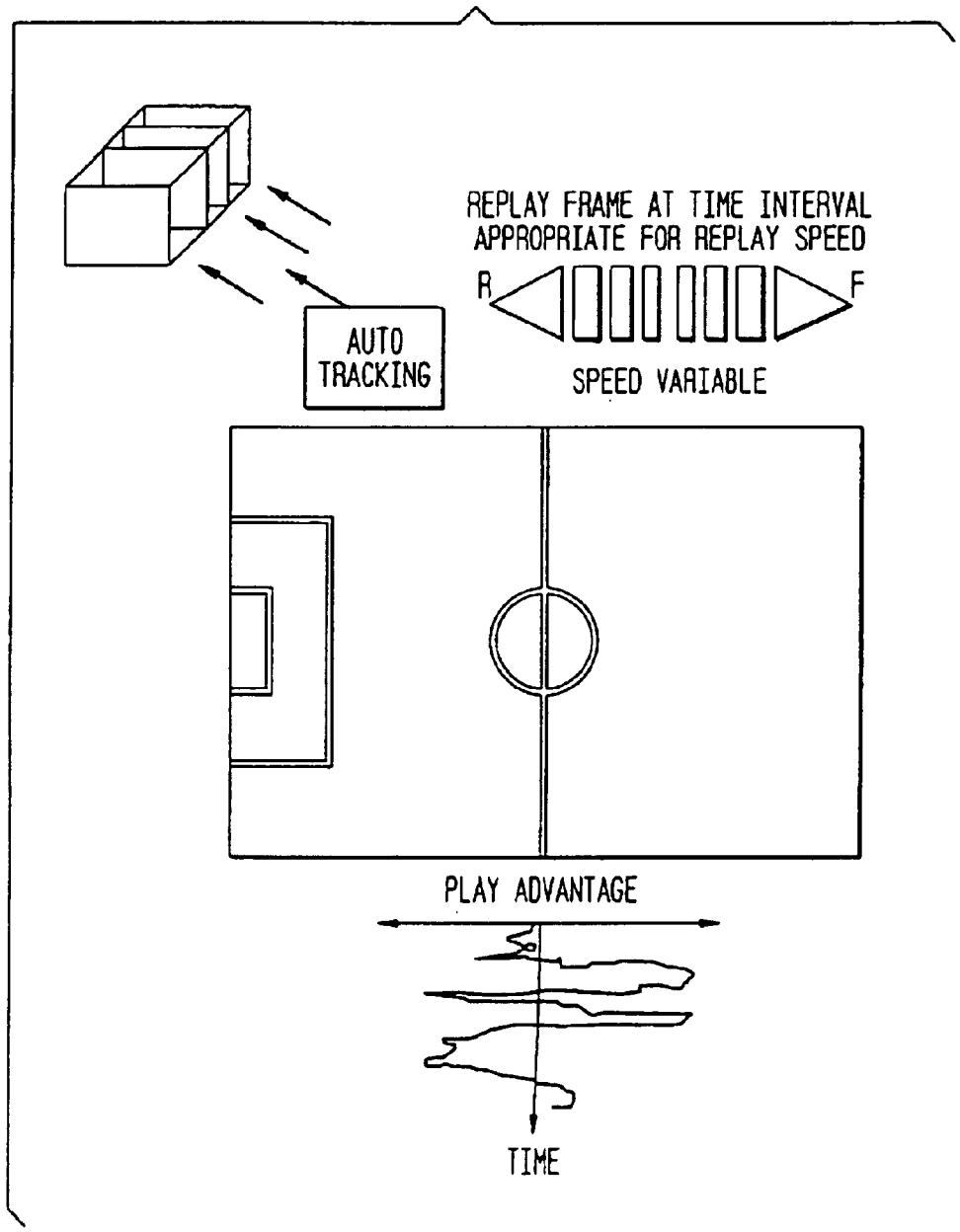
FIG. 5 is a photo diagram showing an example fast forward confirmation screen for the example in FIG. 3.

FIG. 5 is a diagram showing an example display for a confirmation screen for fast forward (step S12). In the example in FIG. 5, window 1 for displaying images of video contents is not shown. In window 1, video is fast forwarded (frame skipping and displaying). Since during fast forward all the video frames are not replayed, a time interval that is appropriate for the replay speed is used for the replay of the frames. In window 2, for displaying the trajectory of an object, the overhead view of an object that continues to follow the trajectory for a specific time period is displayed. That is, all the objects that appear in the film are converted into those in the overhead view, and are displayed as moving objects, on a pitch screen. When the film is fast forwarded, noise may be generated or the movement of an object may be missed; however, when the objects moving on the pitch screen are used, the game as a whole can be observed. Further, since the trajectory of an object is also displayed at specific time intervals, the chances are reduced that the movement of the object will be missed during fast forwarding. In the example in FIG. 5, the play advantage of a team is displayed along the time axis in the lower part the window 2. That is, a numerical value, which is a reference (play advantage) for the fast forward speed, is displayed along the time axis, and the user uses the value of the play advantage as a reference when increasing or reducing the replay speed. As for the play advantage, the possibility of a player scoring in a soccer game is used as a reference, and the distance from an approaching player who is handling a ball to the goal of an opposing team is represented along the time axis. Different colors are used to identify the teams.

Finally, the resumption of the normal replay (step S13) is performed as follows. Since during fast forwarding a user may pass a desired scene, the user can use a mouse to click on a point along the trajectory to automatically track a corresponding frame.

Figure 6:
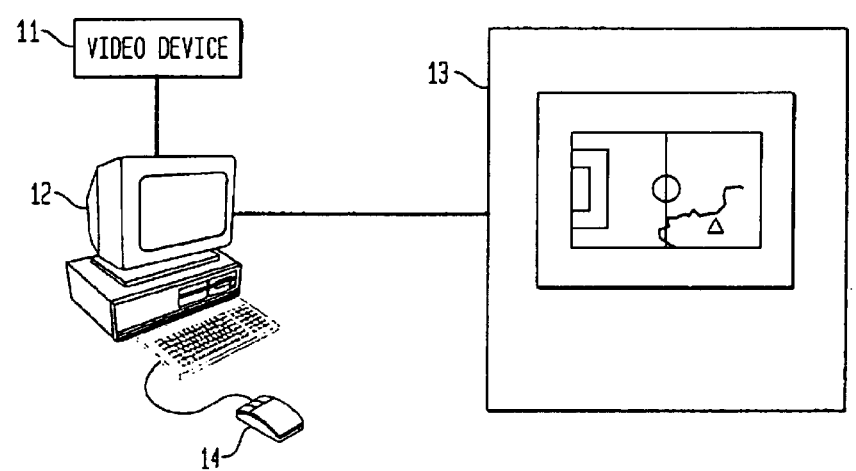
FIG. 6 is a diagram showing the arrangement of an apparatus for carrying out the video contents accessing method of the present invention.

FIG. 6 is a diagram showing an example arrangement of an apparatus for carrying out the video contents accessing method of the present invention. In FIG. 6, the apparatus comprises: a video device 11, for replaying video contents; a computer 12, including a circuit for extracting objects from video contents; a display device 13, for displaying the movements of the objects as trajectories on a specific projection screen; and a pointing device 14, for specifying a location on the trajectory. With this arrangement, the pointing device 14 is used to click on a location along the trajectory on the display device 13, so that a desired scene contained in the video contents can be accessed.

The following functional arrangement of the above described present invention is the most important feature.

(1) A function, for using an interface that uses a trajectory on a projection screen to represent the status of a player, is provided for designating a point on the trajectory using the pointing device and jumping from the designated point to a corresponding video frame, or for moving a pointer along the trajectory to replay a corresponding video frame. This function is used for efficient video accessing.

(2) The trajectories of objects, for scanning the video contents, are displayed in order with time for the contents, and the status of the contents is reported to the user. A user does not experience an odd sensation even when the speed at which the trajectory is displayed is higher than the actual video rate, and throughout a game can view the movements of players at a high speed.

(3) A method for controlling the display speed for trajectories is provided for the user. Thus, the user can fast forward unimportant portions, and replay in slow motion the trajectory of important portions. At this time, the scale (play advantage) that indicates an important scene, e.g., a numerical value that represents the possibility of a player scoring in a soccer game, is displayed at the same time, so that the scale can act as a guideline and help a user decide how to adjust the speed, and when to halt the display and access the video data.

As is described above in detail, the objects, such as the states of players, are specified by using trajectories displayed on a projection screen, without directly providing a video for a user. Therefore, the process performed by a computer is simplified, and it is anticipated that the status of a game will be reported to a user, even if the trajectories of the objects are displayed at high speed. In addition, the user can use a trajectory to determine which video frame is to be accessed, and only when the user has selected a point on the trajectory can the current frame jump to a corresponding frame and can a video be replayed. Furthermore, since the information carried by a trajectory interacts with an actual object in the contents, such as an individual player or a ball, to the user it will seem as though he or she is controlling it directly. As a result, the desired video image scene can be efficiently specified and displayed.

While the invention has been particularly shown and described with respect to preferred embodiments thereof, it will be understood by those skilled in the art that the foregoing and other changes in form and details may be made therein without departing form the spirit and scope of the invention.

Having thus described our invention, what we claim as new, and desire to secure by Letters Patent is:

1. A video contents access method that uses trajectories of objects, comprising the steps of:
   extracting objects from video contents, wherein said (Traj) of said objects are calculated by using a following equation:

$Traj$=(object $ID$, start time, end time, line graph representation):

displaying the movements of said objects on a specific projection screen separate from a video image display providing said video contents;
   concurrently displaying a play advantage scale representing an important scene with said trajectories of objects, said scale functioning as a guide for adjusting a speed for the playback of the trajectory;
   controlling the speed at which said trajectories of said objects are displayed;
   specifying locations along said trajectories; and
   using the locations to access a desired scene contained said video contents.

2. The video contents access method according to claim 1, wherein said trajectories of said objects are those displayed in a time interval between a currently displayed video frame and a preceding video frame displayed a predetermined time period earlier.

3. The video contents access method according to claim 1, wherein video data are digital video data, or analog video data that can manage time code.

4. The video contents access method according to claim 1, further comprising: displaying on the same projection screen a window in which images of said contents of said video are displayed and a window in which said trajectories of said objects are displayed.

5. The video contents access method according to claim 1, wherein to specify said locations along said trajectories, a pointing device is used to designate points along said trajectories.

6. The video contents access method according to claim 1, wherein a plurality of video contents are used.

7. A video contents access apparatus comprising: display means for displaying, as trajectories on a specific projection screen, the movements of objects extracted from video contents;
   wherein, said trajectories (Traj) of said objects are calculated by using following equation:

$Traj$=(object $ID$, start time, end time, line graph representation):

said trajectories being displayed on said projection screen separate from a video image display providing said video contents;
   means for concurrently displaying a play advantage scale for representing an important scene with said trajectories of objects, said scale functioning as a guide for adjusting speed for the playback of the trajectory;
   means for controlling the speed at which said trajectories of said objects are displayed; and
   instruction means for specifying locations along said trajectories, wherein locations along said trajectories are specified by said instruction means to access a desired scene in said video contents.

* * * * *

UNITED STATES PATENT AND TRADEMARK OFFICE
CERTIFICATE OF CORRECTION

PATENT NO. : 6,833,849 B1
DATED : December 21, 2004
INVENTOR(S) : Kurokawa et al.

It is certified that error appears in the above-identified patent and that said Letters Patent is hereby corrected as shown below:

Column 7,
Lines 3 and 4, "wherein said (Traj)" should read -- wherein said trajectories (Traj) --.
Line 7, ":" should be -- ; --.
Line 9, "objects on a" should be -- objects as trajectories on a --.
Lines 12 and 13, "scale representing" should read -- scale for representing --.
Line 19, "locations to access" should be -- locations along said trajectories to access --.
Lines 19 and 20, "contained said" should be -- contained in said --.

Column 8,
Line 15, ":" should be -- ; --.
Line 24, "adjusting speed" should be -- adjusting a speed --.

Signed and Sealed this

Eleventh Day of October, 2005

JON W. DUDAS
*Director of the United States Patent and Trademark Office*